Jan. 22, 1963     R. GAUVAIN     3,074,119
CONTROL MECHANISMS FOR THE NIPPERS
OF RECTILINEAR COMBERS

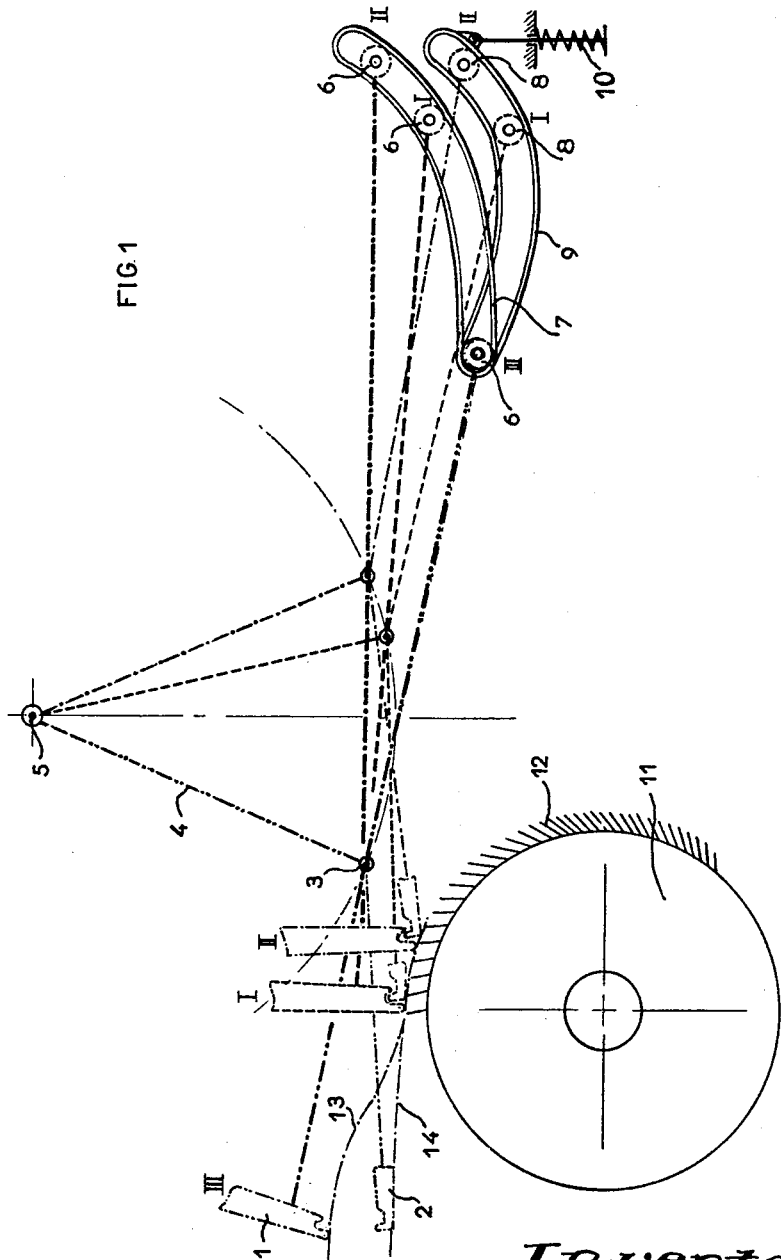

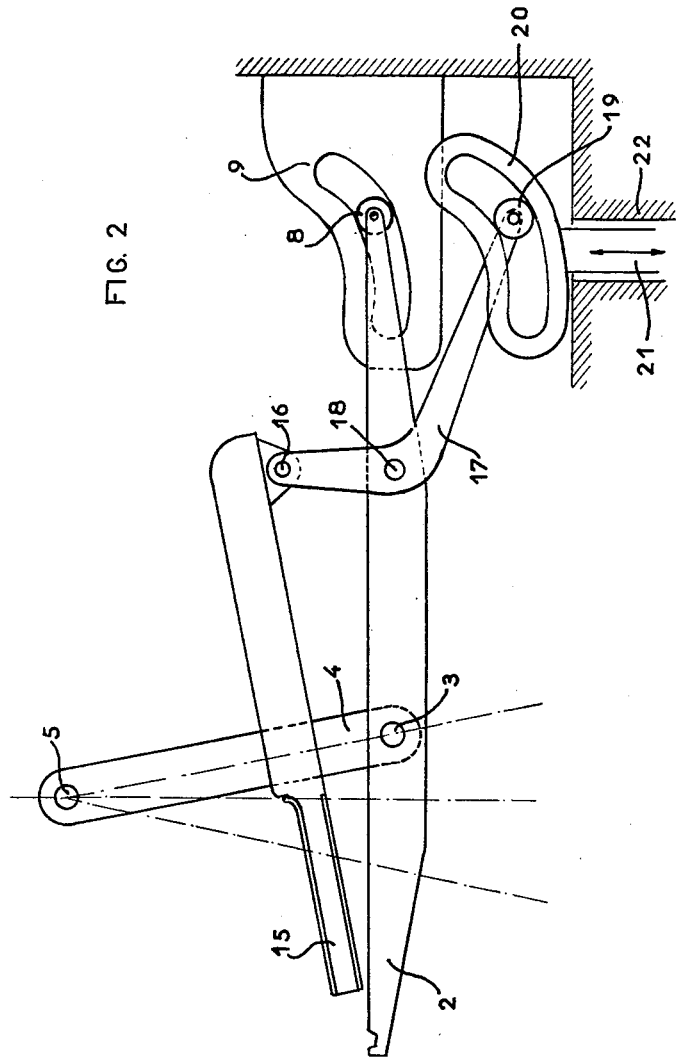

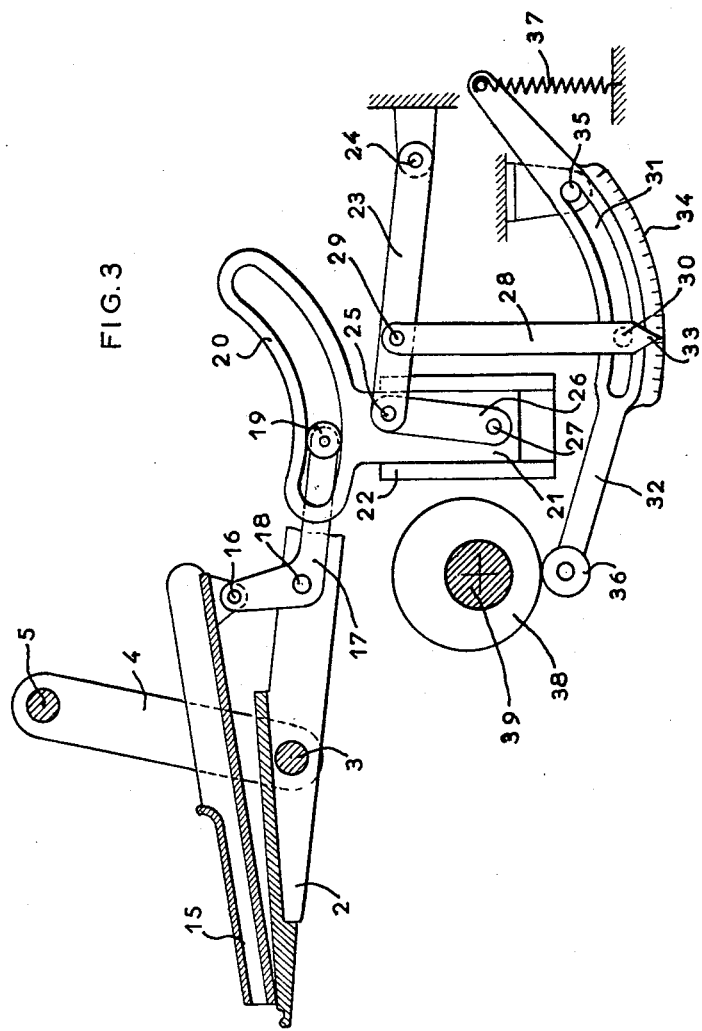

Filed Sept. 3, 1959     4 Sheets-Sheet 4

Inventor
R. Gauvain
By Glascock Downing Seebold
Attys.

United States Patent Office 3,074,119
Patented Jan. 22, 1963

3,074,119
CONTROL MECHANISMS FOR THE NIPPERS OF RECTILINEAR COMBERS
Roger Gauvain, Buhl Haut-Rhin, France, assignor to Societe Alsacienne de Constructions Mecaniques, Mulhouse Haut-Rhin, France, a company of France
Filed Sept. 3, 1959, Ser. No. 837,922
Claims priority, application France Sept. 12, 1958
6 Claims. (Cl. 19—227)

This invention relates to rectilinear combers. It is an object of the invention to greatly simplify the mechanisms controlling the nippers and feed equipment of rectilinear combers more particularly with a view to reducing the number and complexity of moving parts, friction and the detrimental effects of inertia, the invention thus reducing costs and considerably increasing efficiency.

Another object of the invention is to enable the nose end of the nippers of a rectilinear comber to follow a path accurately adapted to the functions of the nippers and comprising, for instance, a reciprocating arc absolutely concentric with the periphery of the comb cylinder so that all rows of needles of the comb segment can defile at each combing cycle in front of and close to the nose end of the nippers. By combining these two movements, the mean linear speed of the nippers is reduced to half that of existing combing machines yet combing is improved, the amount of noils is greatly reduced and the machine runs smoothly and evenly even at the high speeds which the lighter mechanisms allow.

Finally, it is an object of the invention to enable the amplitude of the feed movement to be controlled from outside the machine without any alteration in the end-of-travel position of the feed equipment, while the feed can be stopped completely by a simple zero-setting adjustment of said means without any interruption in the general operation of the machine, including the movement of the nippers.

To achieve all these objects simultaneously, the invention has as its subject matter a mechanism for controlling the nippers and feed equipment of a rectilinear comber, wherein the movement of the nippers, including their opening and closing, however complicated such movement may be, is controlled by a simple rocking arm on which the nippers are suspended in equilibrium and in which the feed movement, although even more complex than the nippers movement, is controlled by a simple slide moved reciprocatingly.

To this end, according to a feature of the invention the rearward ends of the top and bottom nippers are so guided as to cause the nose ends of the nippers to follow a predetermined path and to open and close cyclically when their point of articulation on the aforesaid rocking arm is reciprocated angularly.

It will be apparent that, since the gripper is balanced in respect of its point of articulation to the rocking arm, the friction of the rearward ends on their guiding means is negligible since the whole weight of the nippers and any element borne thereby is supported by the rocking arm. Of course, only very slight friction is produced by the balancing of the nippers around their pivot on the rocking arm.

If this arrangement is compared with some of the prior art devices, particularly those in which the nippers are mounted on a sliding carriage, it will be apparent that the invention greatly reduces friction in this important part of the mechanism.

The path of the nose ends of the nippers, can be given a shape of any desired complexity without the need to use any additional element.

In a preferred embodiment of the invention, the nippers are suspended at the bottom of the rocking arm and the angular movement thereof is arranged to be substantially symmetrical on either side of the vertical. The nippers are thus provided with a real pendulum-like suspension and can therefore be kept in rocking motion by reduced periodic forces comparable with the pulses given to the balance arm of a clock.

This step renders almost completely negligible the detrimental effects of the inertia of the system, the inertia being used almost completely for the pendulum effect. This advantage is all the more appreciable in that the nippers of the rectilinear combers are very heavy.

In one embodiment of the invention, the rear ends of the nippers are guided in separate slide ways the shape of which is calculated according to the path to be followed by the nose ends of the nippers.

In a construction according to the invention, the feed equipment is constituted by a feed rack fitted directly for reciprocatory motion to the bottom nipper and is controlled by a lever articulated thereto, the free end of the latter lever being guided in an additional slideway identical to and parallel with the slideway determining the path of the bottom nipper. It will be apparent that the required feed movement can be provided if relative reciprocation can be produced between the two slideways, preferably transversely to the general direction thereof.

This feature provides a number of advantages. Since the feed movement is determined in relation to the nippers themselves and not as in conventional machinery, in dependence upon the general mechanism of the machine, the simple reciprocating movement hereinbefore described is always enough on its own to control the feed system, however complex the path followed by the nippers may be. Lack of registration, which was inevitable with the prior art independent mechanisms, is completely obviated. Finally, the phases of the feed movement can be controlled and distributed in time by very simple means, for the same have merely to vary the law governing the reciprocation aforesaid. In this respect, according to a special feature of the invention the control mechanism hereinbefore described is supplemented by a control device which is readily accessible from outside the machine and by which the amplitude of the said reciprocation can be varied over a predetermined range without altering the position in space of the end point of such movement, such amplitude possibly being reduced right down to zero.

By means of this control device, the amount of fibres introduced into the machine at each combing cycle can be varied simply by moving a single manual control member, while the feed can, if required, be stopped without stopping the machine. A wide variety of inspections or adjustments can therefore be performed without any need to withdraw the fibres from the machine.

In a preferred embodiment, the aforesaid control device consists of a slider movable in a curved slot in one lever of a system comprising a rod interconnecting two levers, one of which is rocked by a cam driven by the general mechanism of the machine, while the other operates a linkage connected to a slide bearing the slideway guiding the control lever for the feed equipment.

According to another feature of the invention, the lever formed with the curved slot has its bearing axis situated at one end of the slot and the same takes the form of a circle arc which, when the slotted lever is in the position corresponding to the end of the feed travel, has its centre coincident with the articulation of the rod to the other lever.

It will therefore be apparent that if the axis of the slider coincides with the axis of the slotted lever, the oscillation thereof will operate neither the rod nor, therefore, the rest of the feed mechanism, with the result that the same is stopped at the end of its travel. On the other hand, the amplitude of the feed movement increases as the slider is moved away from said bearing axis, but the end-of-travel position does not vary because in this position the slider can pass through the whole slot without causing any displacement of the receiving lever.

It should be pointed out that the mechanism for controlling the nippers and the feed equipment according to the invention can be used in any existing or even any future rectilinear comber due to the main feature of the mechanism which is that the paths and the timing of the functions of the nippers (including its cyclic opening movement) and of the feed equipment can be determined as required merely by suitably designing the guiding means.

In another embodiment of the invention, the said guiding means are constituted by two levers articulated at one end on the rear ends of the nippers and at their other end on fixed parts of the machine at points which are so chosen, while the respective lengths of said levers are so calculated that the nose ends of the nippers are caused to follow the desired paths.

With this arrangement, it is possible to further reduce friction between the parts of the device, since the relative rotation between the articulated parts is still smoother than rolling motion of rollers in incurved slide ways.

Moreover, this arrangement permits reducing considerably the cost of the device by suppressing all the machining difficulties which are attached to the construction of slide ways extending along non-circular curves and which are necessarily calculated and constructed with the greatest care since they have to determine the paths of the nose ends of the nippers.

It is also contemplated, in particular for combing short fibres such as cotton fibres, to replace the reciprocating gill bar by a feed roller carried by the nippers and, preferably by the bottom nipper, and to ensure driving of the said roller by means of a gear including a ratchet-wheel mounted on the bottom nipper and actuated by a dog carried by a lever also pivoting on the bottom nipper and linked with another rocking lever controlled by a cam keyed on a shaft preferably constituted by the shaft imparting to the nippers their pendulum motion.

With this arrangement, during each oscillation of the nippers, the dog rotates the ratchet-wheel by a given angle which causes a corresponding rotation of the feed roller.

In one embodiment of the invention, the lever carrying the dog is linked through a connecting-rod to an intermediate lever pivoting around a fixed point and linked to the above mentioned rocking lever through a second connecting-rod.

In a constructive embodiment, in order to adjust the amplitude of the rotation of the feed roller for each stroke of the nippers, one end of the second connecting-rod mentioned above is articulated on the corresponding lever at a point of the latter whose distance to the fixed pivot of the said lever is adjustable at will. By increasing or reducing the said distance, it is possible to vary the stroke of the dog and hence the amplitude of the intermittent rotary motion of the feed roller.

In the previously described construction including a feed rack, the top comb was carried on the latter. When feeding is ensured by a feed roller instead of a feed rack, the top comb has to be mounted otherwise.

For this purpose, the said top comb is mounted at one end of a bar supported, on the one hand near the said end by a pendulum suspended at a fixed point and, on the other hand, by a lever articulated on one of the nippers, conveniently the bottom one, the said lever being given an oscillatory motion from a cam keyed on a shaft preferably that shaft which imparts to the nippers their pendulum motion.

In a specific embodiment, the lever supporting the comb-carrying bar is further articulated on an intermediate lever pivoting around a fixed point and linked through a connecting-rod to the above mentioned rocking lever.

In order to adjust the relative stroke of the top comb with respect to the nippers, the said connecting-rod may be articulated on the coresponding lever at a point of the latter whose distance to its pivot is adjustable at will, so that by increasing or reducing the said distance, it is possible to vary correspondingly the relative stroke of the top comb with respect to the nippers.

The specific constructive dispositions described above permit, inter alia, operating the nippers and the feed roller without giving to the top comb any relative motion with respect to the nippers, which is particularly interesting for combing very short fibres. They also permit separately studying the behaviour of the parts, either when the feed roller does not rotate or when the top comb does not move with respect to the nippers.

Other objects and advantages of the invention will be hereinafter described with reference to the accompanying drawings, given merely by way of example.

In these drawings:

FIG. 1 is a very diagrammatic illustration of the nippers of a rectilinear comber according to the invention in the various phases of their operation with rear guiding by means of slideways.

FIG. 2 is a diagrammatic view showing how a feed rack is arranged on the bottom nipper.

FIG. 3 is a simple device for controlling the feed rack illustrated in FIG. 2.

Figure 4:
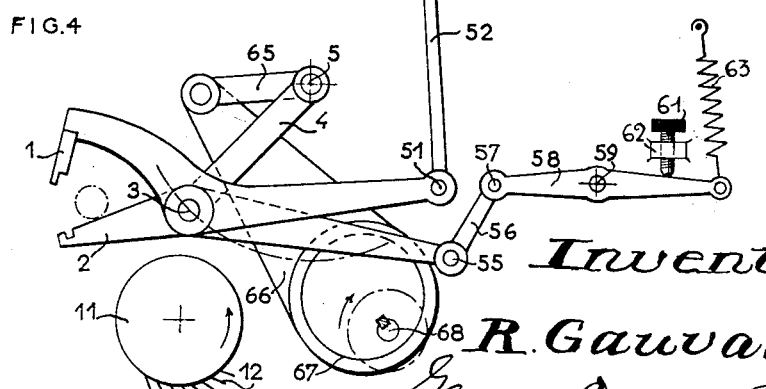

FIG. 4 diagrammatically shows a device for controlling the nippers of a rectilinear comber with rear guiding by means of levers.

Figure 6:
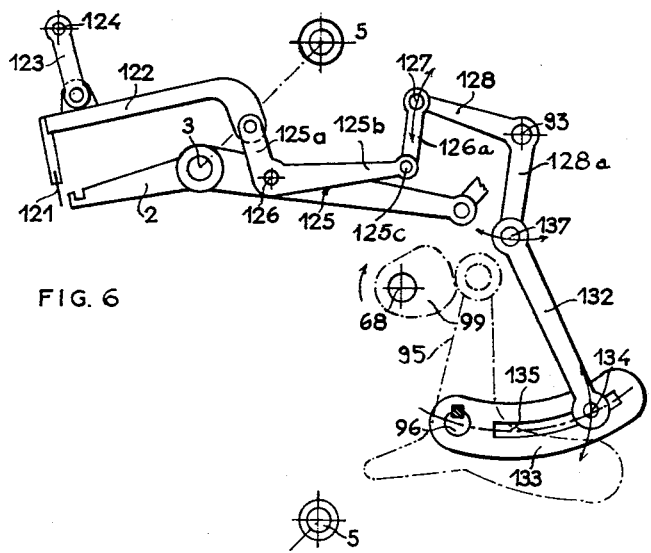
Figure 5:
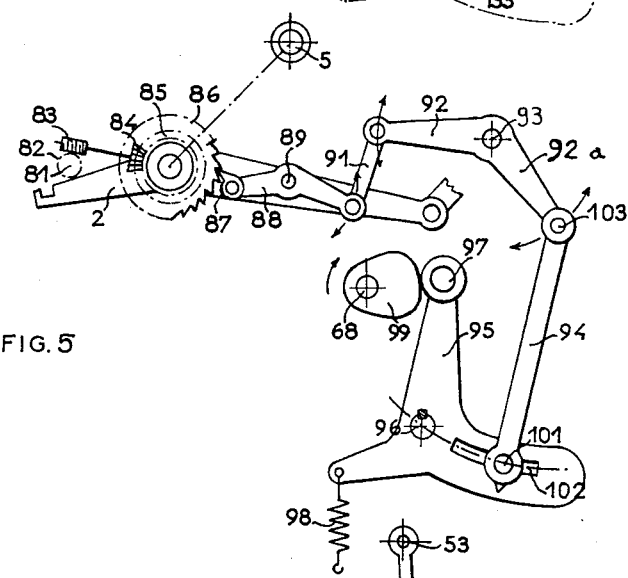

FIG. 5 diagrammatically shows a mechanism for controlling a feed roller carried by the nippers, and FIG. 6 diagrammatically shows a mechanism for controlling the top comb.

On the several figures, the correspondant parts have been designated by the same references.

Referring to FIG. 1, in the control mechanism according to the invention, the top nipper 1 and bottom nipper 2 of a rectilinear comber are suspended by their articulation axis 3 on a rocking arm suspension rod so that the weight of the nippers is substantially in equilibrium on said axis. In the embodiment illustrated the nippers are suspended at the bottom end of a rocking arm diagrammatically represented at 4, and of which there can be seen at 5 the axis of suspension on the machine framework.

In the embodiment shown in FIG. 1, the rearward end of the top nipper 1 is provided with a roller 6 guided in a curved slideway 7. Similarly, the rearward end of the bottom nipper 2 is provided with a roller 8 guided in a slideway 9 which is also stationary during most of the nippers travel but which rises slightly at the end of the said travel to compress a spring 10 to press the nippers closed, as will be seen hereinafter in greater detail. It will be seen in FIG. 1 that the rollers 6 and 8 appear to coincide in position III. This appearance is purely fortuitous; the plane of the slideways 9 and 7 are, of course, separate from one another and the front ends thereof are not necessarily in alignment with one another. To help understand the operation of the control mechanism the articulated arm of the top nipper 1 is diagrammatically illustrated by a straight axis, while the articulated arm of the bottom nipper 2 is diagrammatically illustrated by a broken line. This form of representation does not, of course, limit the invention to any particular nippers design. To further help understand the invention, the axis of the top nipper is illustrated in heavier line than the axis of the bottom nipper, the two axes being shown in dotted line for the formation denoted by the reference I, in chain-double-dotted lines for the formation denoted by the reference II and in chain-dotted lines for the formation denoted by the reference III. The same symbols have been used to denote the three corresponding positions of the axis of the rocking arm 4 and of the profiles of the nose ends of the nippers. Some axes have been interrupted on either side of the articulation 3 of the nippers to clarify the drawing; similarly, only the nose ends of the nippers are shown.

The combing cylinder 11, on which there can be seen needles 12 increasing in number, is shown in the position corresponding to the beginning of the phase of combing of the head end of the tuft which corresponds to the formation I of the nippers. The other combing phases are not shown in order not to encumber the drawing. The paths followed by the top nipper 1 and bottom nipper 2 have the references 13, 14 respectively and their rearward ends coincide for closure of the nippers and, in the example illustrated, are concentric with the periphery of the combing cylinder 11. However, the invention is not limited to any particular path shown and the paths can vary ad infinitum merely by a modification in the shape of the slideways 7 and 9.

The example illustrated in FIG. 1 operates as follows:

In formation I, which corresponds to the beginning of the phase of combing the head end of the tuft, the arm 4 is inclined slightly backwards, the rollers 6 and 8, guided in their respective slideways 7, 9, keep the nippers 1, 2 closed, and the roller 8 tenses the spring 10 slightly to apply a resilient closure pressure to the nippers. The arm 4 tilts more to the rear under under the action of the general mechanism of the machine through the agency of appropriate rods (not shown); the rollers 6, 8, rise along the slideways 7, 9 as far as position II while remaining in substantially the same spacing. The nippers are kept closed by pressure, the nose ends of the nippers move along the common rearward part of their paths 13, 14 which is concentric with the combing cylinder 11, and the same moves substantially half the set of needles in front of the nippers. It will be noted that in this example, during this initial phase which corresponds to the loosening of the fibres by a comparatively reduced number of needles, the combing cylinder and the nippers move in opposite directions to one another so that their relative speed is fairly high. However, this relative speed decreases progressively to become equal to the speed of the combing cylinder the instant when the nippers stop at II.

The rocking arm 4 then moves forwards. During the first part of its rocking motion it returns the members to formation I and the nose ends of the nippers run in the opposite direction over the path which is concentric with the combing cylinder, while the same moves the remainder of the needles before it. It will be noted that during this phase, which corresponds to the actual combing of the head end of the tuft by an increasingly large number of needles, the said relative speed decreases progressively because the nippers move increasingly rapidly in the same direction as the combing cylinder while the speed thereof decreases slightly.

In this embodiment, therefore, the main advantage of the mechanism according to the invention, i.e., the advantage that any required path can be chosen for the nose ends of the nippers provides a very favourable combing cycle. The rocking arm 4 continues to move forwards after having passed through formation I, the rollers 6, 8 guided in the slideways 7, 9 approach one another and open the nippers 1, 2 while causing the same to follow their respective paths 13, 14 as far as position III.

It will be apparent that the control mechanism hereinbefore described is much simpler than with conventional combing machines, since its only operative element is a simple rocking arm 4, the complex paths being provided by the shape of the slideways 7, 9. It will also be apparent that, since the nippers are suspended in balanced manner around the spindle 3, the rollers 6, 8 can be guided in the slideways 7, 9 without appreciable friction, while the friction of the nippers on the spindle 3 is also negligible.

The forces opposing operation of the nippers are therefore reduced very considerably. Finally, in the example illustrated a real pendulum suspension has been provided and the natural rocking movement of the nippers can be sustained by reduced periodic efforts.

Referring to FIG. 2, the bottom nipper 2 is articulated at 3 to the bottom of a rocking arm 4 suspended on the machine frame at 5. The roller 8 guides the rear end of the nipper 2 in a slideway 9 which, to simplify the illustration of the feed equipment control mechanism, is assumed to be stationary although in practice the slideway could, of course, be of the spring kind described with reference to FIG. 1.

The feed rack 15 is articulated at 16 to one end of a bent lever 17 articulated at 18 to the rearward part of the bottom nipper 2. The free end of the bent lever 17 bears a roller 19 guided in a slideway 20 which is always parallel with the slideway 9 but is fitted to a slide 21 guided in a stationary part 22 so that the slideways 20, 9 can be moved towards or away from one another while always being maintained parallel with one another.

It will be readily apparent that, with this arrangement, when the rocking arm 4 rocks the nipper 2, then, if the slide 21 remains stationary, the constant separation between the rollers 8, 19 maintains the feed rack 15 in the same position relatively to the nipper 2. On the other hand, whatever the position of the nipper 2 the separation between the rollers 19 and 8 can be reduced, and the feed rack 15 can therefore be moved towards the nose end of the nipper 2, by moving the slide 21 in the direction associated with movement of the slideway 20 toward the slideway 9.

It will be apparent that the feed rack 15 can be controlled by a simple translational movement of the slide 21 however complex the path of the nipper 2 may be, since the fact that the slideways 20, 9 are parallel with one another means that the relative position between the feed rack 15 and the nipper 2 is independent of the path thereof.

FIG. 3 illustrates a particular embodiment of the feed rack control mechanism which provides a control, possibly to the extent of complete cancellation, of the amplitude of the advancing movement of the feed rack 15 but without any change in the position thereof relatively to the nipper 2 at the end of the feeding movement. The parts of FIG. 3 are shown in this end-of-movement position. Only the slideway 20 is illustrated because, in the position shown in FIG. 3, the projections of the slideways 20, 9 coincide in the plane of the drawing. Elements corresponding to the elements shown in FIGS. 1 and 2 have like references and will not be described again. The slide 21 is operated by a lever 23 pivoted to a stationary part of the frame on a pivot 24 and articulated at 25 to a link 26 which connects it at 27 to the slide 21. A rod 28 articulated to the lever 23 at 29 has at its free end a pin 30 slidable in an arcuate slot 31 in a second lever 32. The rod 28 also bears a pointer 33, the position of which is shown by a curved scale 34 of the lever 32. The same bears at 35 against a stationary part of the frame and bears a roller 36 maintained in continuous engagement by a spring 37 with a cam 38 driven by a shaft 39 connected to the general mechanism of the machine. The bearing pivot 35 of the lever 32 coincides with that end of the curved slot 31 which is farther from the roller 36. In the position illustrated, which corresponds to the end of the operative movement of the feed rack 15, the roller 36 is at the minimum distance from the spindle of the cam 38. With the device in the position illustrated, the pivot point 29 where the rod 28 is articulated to the lever 23 coincides with the center of curvature described by the curved slot 31.

If the pointer 33 is now moved to the zero mark on the scale, in which position the axis of the pin 30 coincides with the pivot 35 of the lever 32, the same, which is rocked by the cam 38 around the pivot 35, will therefore also be rocked around the axis of the pin 30 and will not displace the rod 28 nor the rest of the mechanism; the feed rack 15 will therefore remain stationary relatively to the nipper 2 at the end of the feeding movement.

In other words, rocking of the nipper 2 will not be associated with a feed movement. With this arrangement the machine can operate idly without any need to remove the fibres from it.

The nippers 1 and 2 may also be described or referred to as nipper levers, each forming arm portions with nipper jaws at the forward ends of the arm portions.

Also, it has been seen that when the cam is in the position shown, the spindle 29 is at the center of the curved slot 31. The pointer 33 can therefore move over the whole scale 34 without causing any offsetting of the feed rack 15 from its end-of-movement position. On the other hand, the farther the pointer 33 is moved from the zero position, the greater becomes the length of the lever arm 32 acting on the rod 28 and therefore the greater becomes the return amplitude of the feed rack 15 at each revolution of the cam.

Of course, the cam 38 can be variable or have a more complex profile providing, inter alia, a counter-feeding phase at each revolution of the cam, without for that reason departing from the scope of the invention.

In the embodiment shown in FIGS. 4 to 6, a lever 52 is articulated by means of a pivot 51, on the rear end of the top nipper 1. At its other end, the lever 52 is pivoted at 53 on the machine frame.

Similarly, a connecting-rod 56 has one end articulated at 55 on the rear end of the bottom nipper 2 and its other end articulated at 57 on one end of a lever 58, pivoted on a fixed spindle 59 and having its free end held, against an adjustable abutment constituted by a screw 61, engaged in a boss 62 of the machine frame, by means of a spring 63 which has for its purpose to limit the clamping stress between the two nippers under the action of the above described mechanism.

The location of the fixed pivots 53 and 55, as well as the length of the nippers, the levers 52, 58 and the connecting-rod 56 are such that in response to the oscillatory motion of the lever 4 on which the nippers are suspended, the nose ends of the said nippers are caused to open and close alternately with the desired timing and that, furthermore, the said nippers nose ends follow the needles 12 of the combing cylinder 11 during a part of the nippers path, as explained with reference to FIG. 1.

The motions of the nippers, i.e., that of the rocking lever 4, is controlled by an alternating angular displacement of the shaft 5 on which is keyed another lever 65 whose free end is linked through a connecting-rod 66 with an eccentric crank-pin 67 mounted on a main control shaft 68.

The control shaft 68 is journaled on the machine frame and rotates uniformly. At each turn, through the connecting-rod 66, it causes oscillation of the shaft 5 and the lever 4 which ensures the desired motion of the nippers. It may be seen in FIG. 4 that the rear ends of the nippers are supported and guided along well-defined paths solely by the articulations 51 and 55, i.e., with minimum friction. The working of the whole assembly is therefore extremely smooth.

In FIG. 5, there is diagrammatically shown at 81 a feed roller journaled in bearings (not shown) carried by the bottom nipper 2. The feed roller rotates intermittently always in the same direction under the action of a drive including a toothed wheel, a worm 83 meshing with the said toothed wheel and keyed with a bevel pinion 84 meshing with another bevel pinion 85 keyed with a ratchet-wheel 86. The latter is adapted to be actuated by a dog 87 mounted at one end of a lever 88 articulated on a pivot 89 mounted on the bottom nipper 2. The other end of the lever 88 is linked through a connecting-rod 91 to an intermediate lever 92 rigid with a shaft 93 journaled in the machine frame. The arm 92a of lever 92 is linked through a connecting-rod 94 to a rocking lever 95 keyed on a shaft 96 journaled in bearings mounted in the machine frame. The lever 95 carries a roller 97 held by a spring 98 in contact with a cam 99 keyed on a continuously rotating control shaft which, in the example shown, is constituted by the shaft 68 controlling the nippers.

The connecting-rod 94 is articulated at one end, in the example shown the lower one, on the lever 95 by means of a pivot 101 adjustable at will along a slide way 102 one end of which is located near the shaft 96 and which extends concentrically with the articulation axis 103 of the connecting-rod 94 on the lever 92, when the rocking lever 95 is pushed back substantially to the end of its stroke by the cam 99.

This control device of the feed roller operates as follows:

Whenever the control shaft 68 rotates by one turn, the cam 99 imparts a complete oscillation (to and fro) to the lever 95 which, through the connecting-rod 94, oscillates the lever 92. The latter oscillates in turn, through the connecting-rod 91, the lever 88 carrying the dog 87, so that during the operative stroke of the mechanism, the dog 87 rotates the ratchet-wheel 86 by a certain angle which causes angular displacement by a corresponding angle of the feed roller 81.

It is to be noted that in this device, otherwise similar to that provided in the embodiment of FIGS. 2 and 3 to adjust the stroke of the feed rack it is not necessary, as it was in the latter, for completely stopping the feeding motion to bring the axis of the crank-pin 101 into coincidence with the axis of the shaft 96. As a matter of fact, it suffices to bring said axes sufficiently near each other to make the amplitude of the angular stroke of the dog 87 smaller than the angular distance between two adjacent teeth of the ratchet-wheel 86. This permits simplifying the construction of the slide way 102. If the articulation axis 101 of the connecting-rod 94 on the lever 95 is displaced with respect to the shaft 96, there is obtained, for a constant amplitude of the oscillation of the rocking lever 95 a variable amplitude of the motion of the whole device controlling the intermittent rotation of the feed roller 81. Since the incurved slide way 102 is concentric to the axis 103, this adjustment can take place conveniently without causing any shifting of the whole mechanism associated with the dog.

In FIG. 6, is shown a device for controlling the top comb 121 which is mounted at the front end of a bar 122 carried, near the said front end, by a pendulum 123 articulated on a fixed pivot 124 and by one arm 125a of a bell-crank lever 125 pivoted at its apex 126 on the bottom nipper 2. The other arm 125b of the said bell-crank lever is articulated at 125c to a link 126a articulated at 127 on the free end of another bell-crank lever 128, 128a having its apex freely rotatable around the shaft 93. The arm 128a of this lever is linked at its free end through a connecting-rod 132 to another lever 133 keyed on a shaft journaled in the machine frame and which, in the example shown, is constituted by the shaft 96 controlling the feed roller.

The shaft 96 is actuated by the cam 99 keyed on the shaft 68 through the lever 95 as described above with reference to FIG. 5 and as shown in dot-dash line in FIG. 6.

For adjusting the amplitude of the motion of the top comb 121, there is provided an adjustable link between the lever 133 and the connecting-rod 132, by means of an incurved slide way 135 provided in the said lever and which is concentric to the articulation axis 137 of the connecting-rod 132 on the lever arm 128a when the top comb 121 is located in its foremost position, the said slide way 135 extending up to the near vicinity of the shaft 96.

This control device of the top comb 121 operates as follows:

Whenever the control shaft 68 rotates by one turn, the cam 99 keyed on said shaft oscillates the lever 95 first in one direction and then in the other one, which causes, through the other parts of the above described mechanism, a corresponding to and fro motion of the bar 122 carrying the comb 121.

If the magnitude of the comb stroke with respect to the nippers is to be varied, it suffices to this effect to displace the end 134 of the connecting-rod 132 in the slide way 135 with respect to the shaft 96.

While the invention has been described with particular reference to a preferred embodiment, it is not intended to limit the scope of the invention to the embodiment illustrated, nor otherwise than the terms of the subjoined claims.

What is claimed is:

1. A control device for a rectilinear comber having a combing cylinder, comprising a rocking arm having upper and lower ends, means pivotally securing the upper end of said arm to a fixed point located above the axis of said cylinder, a pair of nippers mounted for free oscillation on the lower end of said rocking arm around an axis on either side of which their own weight is equally distributed, said nippers each having forward and rearward end portions, means for separately guiding without any substantially sliding fraction said rear ends of said nippers so that whenever the rocking arm is oscillated about said fixed point said forward ends of said nippers are caused to follow predetermined reciprocating paths including a common terminal portion to cause cyclic closing and opening of said forward ends of the nippers relative to one another as well as a predetermined cyclic relative motion between said forward ends of the nippers when closed and said combing cylinder.

2. A control device according to claim 1 wherein said rear end of each nipper is guided in a slide way.

3. A control device according to claim 2, wherein the slide way guiding said rearward end of one of said nippers is subjected, when the nippers are closed, to the action of a spring yieldingly pressing said nippers against each other.

4. A control device according to claim 1, having a frame with said means for separately guiding the nippers comprising a plurality of connecting levers connected at their one ends to the rearward ends of the nippers and pivotally related at their other ends to the frame.

5. A control device according to claim 4, wherein one of the connecting levers guides one of the rearward ends of the nippers and is linked to the machine frame through a yielding member to limit the clamping stress between the forward ends of the nippers.

6. In a rectilinear combing machine comprising a circular comb and nippers movable relatively to each other and relatively to said circular comb, a suspension rod having upper and lower ends, said upper end being pivotally secured to a fixed point of said machine, two substantially horizontal nipper levers, each lever having arms, said levers being fulcrumed in substantially stable equilibrium on a common pivotal point at the lower end of said suspension rod, one of said nipper levers comprising an upper nipper jaw and the other nipper lever a lower nipper jaw, one arm of one of said levers carrying the upper jaw and one arm of the other lever carrying the lower jaw of said nippers, means to impart swinging motion to said suspension rod about said fixed point to thereby move said nippers relatively to the periphery of said circular comb, and means to guide the other arms of said two levers each along one of two distinct arcuate paths, respectively, one of said two paths being designed so that said lower jow reciprocates substantially tangentially to said periphery of the circular comb from and towards a predetermined tangent point thereof, and the other path being designed so as to produce opening and closing movement of said upper jaw relatively to the lower jaw as the latter reciprocates from and towards said tangent point.

References Cited in the file of this patent

UNITED STATES PATENTS

| 1,466,846 | Nasmith | Sept. 4, 1923 |
| 2,005,001 | Nasmith | June 18, 1935 |
| 2,378,465 | Crockett | June 19, 1945 |
| 2,384,603 | Crockett | Sept. 11, 1945 |
| 2,410,150 | Crockett | Oct. 29, 1946 |
| 2,416,840 | Nasmith | Mar. 4, 1947 |
| 2,974,375 | Naegeli | Mar. 14, 1961 |

FOREIGN PATENTS

| 122,328 | Switzerland | Sept. 16, 1927 |